US012489895B2

United States Patent
Guo et al.

(10) Patent No.: US 12,489,895 B2
(45) Date of Patent: Dec. 2, 2025

(54) FAST SEARCH AND SELECTION OF A TRANSFORM KERNEL FOR AV1 ENCODING

(71) Applicant: Zoom Video Communications, Inc., San Jose, CA (US)

(72) Inventors: Yi Guo, Hangzhou (CN); Zhichu He, Hangzhou (CN); Rui Li, Hangzhou (CN); Jing Wu, Hangzhou (CN); Minxia Yang, Hangzhou (CN); Shiyan Zhang, Qingdao (CN); Yichen Zhang, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 138 days.

(21) Appl. No.: 18/111,944

(22) Filed: Feb. 21, 2023

(65) Prior Publication Data

US 2024/0236320 A1    Jul. 11, 2024

(30) Foreign Application Priority Data

Jan. 9, 2023  (CN) .......................... 202320059979.4

(51) Int. Cl.
*H04N 19/12*  (2014.01)
*H04N 19/172*  (2014.01)

(52) U.S. Cl.
CPC .......... *H04N 19/12* (2014.11); *H04N 19/172* (2014.11)

(58) Field of Classification Search
CPC .............................. H04N 19/12; H04N 19/172
USPC .................................................... 375/240, 40
See application file for complete search history.

(56) References Cited

U.S. PATENT DOCUMENTS

| | | | | |
|---|---|---|---|---|
| 10,848,765 B2 * | 11/2020 | Joshi | ..................... | H04L 65/762 |
| 11,589,066 B2 * | 2/2023 | Choi | .................... | H04N 19/159 |
| 2018/0241414 A1 * | 8/2018 | Gresset | ............ | H03M 13/2957 |
| 2022/0329860 A1 * | 10/2022 | Zhao | .................... | H04N 19/176 |
| 2024/0040151 A1 * | 2/2024 | Nalci | .................. | H04N 19/172 |

* cited by examiner

*Primary Examiner* — Susan E. Hodges
(74) *Attorney, Agent, or Firm* — Kilpatrick Townsend & Stockton, LLP

(57) ABSTRACT

Methods, systems, and apparatus, including computer programs encoded on computer storage media for fast search of transform kernel selection. A set of transform kernels are selected. Multiple images are encoded via the AV1 coded using the selected transform kernels. The encoded images are transmitted to another computing device.

20 Claims, 6 Drawing Sheets

FAST SEARCH AND SELECTION OF A TRANSFORM KERNEL FOR AV1 ENCODING

CROSS-REFERENCE TO RELATED APPLICATIONS

None.

FIELD

The application relates generality to the field of image and video compression, and more specifically to the selection of and use of transform kernels for encoding, via the AV1 video codec, digital images and videos.

SUMMARY

The appended claims may serve as a summary of this application.

DETAILED DESCRIPTION OF THE DRAWINGS

Figure 1A:
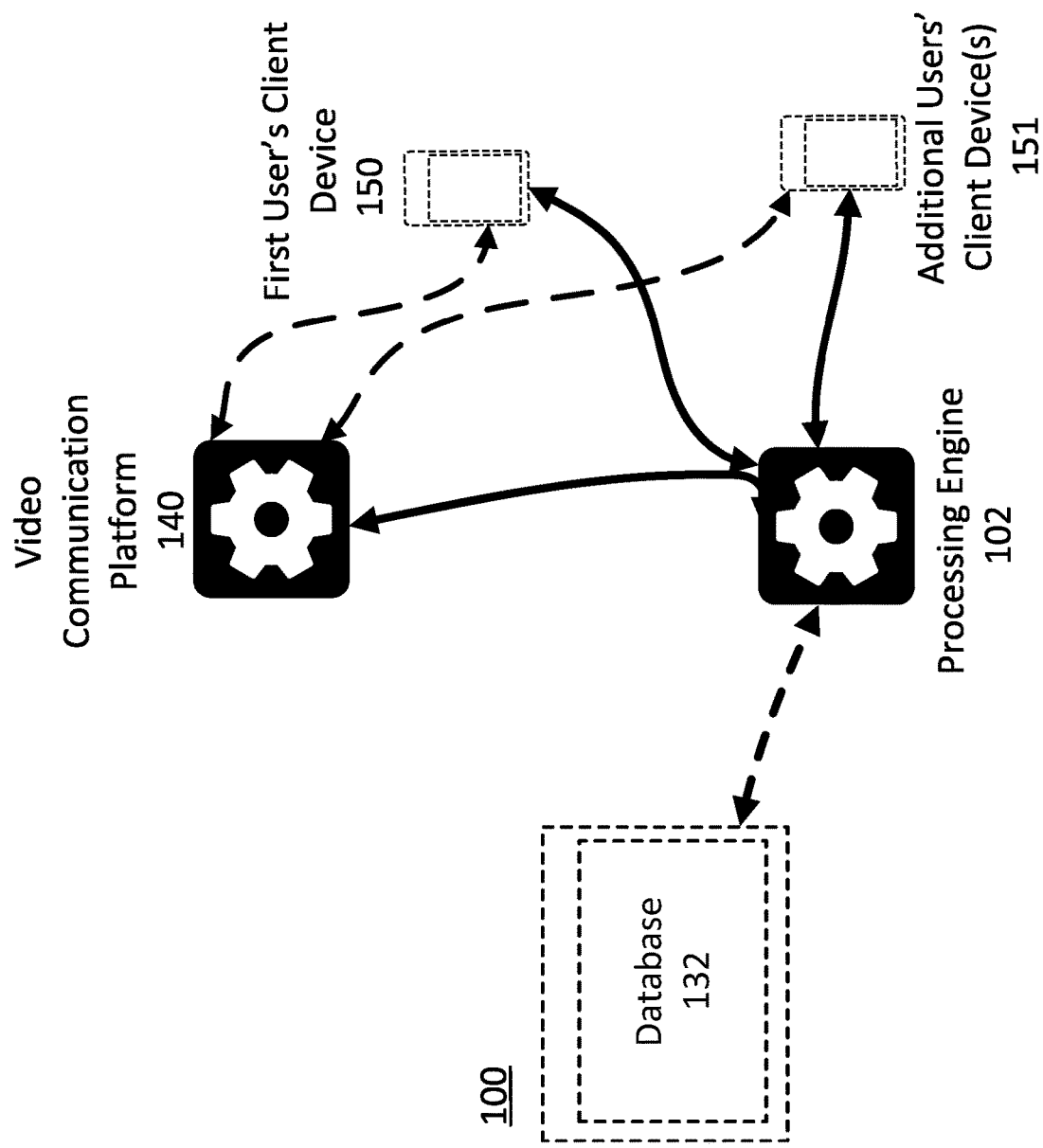
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein. Methods, systems, and apparatus, including computer programs encoded on computer storage media, include operations performed by a client device determining audio control intention during a video communications session. A client device may receive a video stream depicting a video conference participant. The video stream may include one or more image frames depicting the video conference participant. The client device may have various interconnected audio devices, such as speakers, headsets and/or microphones. The client device may encode video using the AV1 code for transmission to other devices and/or receive and decode AV1 encoded video that was transmitted by another client device. Interconnected audio devices may include peripherals connected to a client device, such as separate microphones and/or speakers. Interconnected audio devices may also include components such as microphones and/or speakers integrated into mobile devices (e.g., laptops, mobile phones and tablet devices). Interconnected audio devices may be connected via wire and/or wireless connections to the client device.

FIG. 1A is a diagram illustrating an exemplary environment in which some embodiments may operate. In the exemplary environment 100, a first user's client device 150 and one or more additional users' client device(s) 151 are connected to a processing engine 102 and, optionally, a video communication platform 140. The processing engine 102 is connected to the video communication platform 140, and optionally connected to one or more repositories (e.g., non-transitory data storage) and/or databases, including a device image data set 130 for training a machine learning network, a device configuration database 132, and a software application configuration database 134. One or more of the databases may be combined or split into multiple databases. The first user's client device 150 and additional users' client device(s) 151 in this environment may be computers, and the video communication platform 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device. While the video communication platform is illustrated as a type of software system that may be configured by the processes described herein, other type of systems, software or applications that may use different computing devices and/or peripherals may be also be configured.

In an embodiment, processing engine 102 may perform the methods 300, 400 or other methods herein and, as a result, provide for determining audio control intention during a video communications session. In some embodiments, this may be accomplished via communication with the first user's client device 150, additional users' client device(s) 151, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein. In some embodiments, the processing engine 102 may be multiple applications with an instance operable on each of the client devices 150, 151.

The first user's client device 150 and additional users' client device(s) 151 may be devices with a display configured to present information to a user of the device. In some embodiments, the first user's client device 150 and additional users' client device(s) 151 present information in the form of a user interface (UI) with UI elements or components. In some embodiments, the first user's client device 150 and additional users' client device(s) 151 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, video conference, webinar, or any other suitable video presentation) on a video communication platform. The first user's client device 150 and the additional suer's client device(s) 151 may each be configured and interconnected with respective audio devices, such speakers, microphones and headsets.

The additional users' client device(s) 151 may be configured to view video conference participants, video presentations, and in some cases, presenting material and/or video as well. In some embodiments, first user's client device 150 and/or additional users' client device(s) 151 include an embedded or connected camera which is capable of generating and transmitting video content in real time or substantially real time. In some embodiments, first user's client device 150 and/or additional users' client device(s) 151 include connected speakers and/or microphones are capable of generating and transmitting audio in real time or substantially real time. For example, one or more of the client devices may be smartphones with built-in cameras, and the smartphone operating software or applications may provide the ability to broadcast live streams based on the video generated by the built-in cameras.

In some embodiments, the first user's client device 150 and additional users' client device(s) 151 are computing devices capable of hosting and executing one or more applications or other programs capable of sending and/or receiving information. In some embodiments, the first user's client device 150 and/or additional users' client device(s) 151 may be a computer desktop or laptop, mobile phone, video phone, conferencing system, or any other suitable computing device capable of sending and receiving information. In some embodiments, the processing engine 102 and/or video communication platform 140 may be hosted in whole or in part as an application or web service executed on the first user's client device 150 and/or additional users' client device(s) 151. In some embodiments, one or more of the video communication platforms 140, processing engine 102, and first user's client device 150 or additional users' client device(s) 151 may be the same device. In some embodiments, the first user's client device 150 is associated with a first user account on the video communication platform, and the additional users' client device(s) 151 are associated with additional user account(s) on the video communication platform.

Video communication platform 140 comprises a platform configured to facilitate video presentations and/or communication between two or more parties, such as within a video conference or virtual classroom. In some embodiments, video communication platform 140 enables video conference sessions between one or more users. The video communication platform 140 may interact with different client devices that are interconnected with different computing devices and peripherals. For example, a client device may interconnect with different microphones, cameras, keyboards, mice, tablets and other input peripherals. Also, the video communication platform 140 may interact with different computing devices such as mobile phones, desktop computers, laptop computers, tablet devices, etc.

Figure 1B:
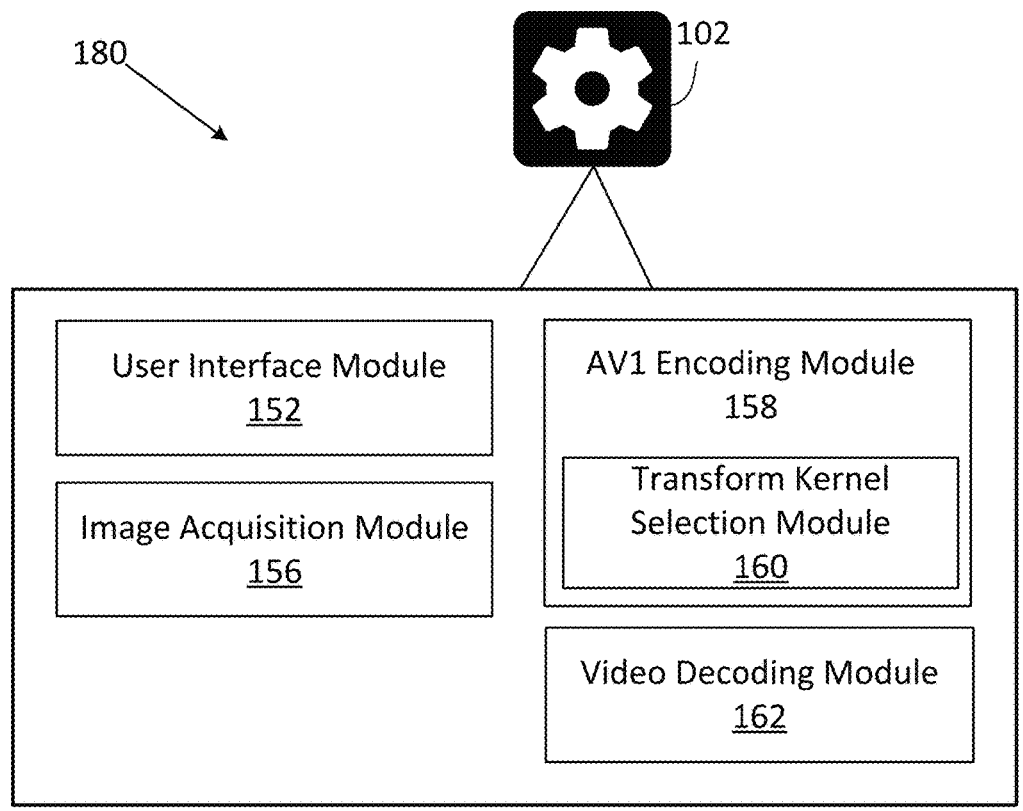
FIG. 1B is a diagram illustrating an exemplary computer system with software and/or hardware modules that may execute some of the functionality described herein.

FIG. 1B is a diagram illustrating an exemplary computer system 180 with software and/or hardware modules that may execute some of the functionality described herein. Computer system 180 may comprise, for example, a server or client device or a combination of server and client devices for determining audio control intention during a video communication session. An audio control intention may be considered as an action or an event that has been determined to have occurred, or likely to occur, where evaluated images of a video conference participant indicate that the video conference participant has an intention to adjust, change or control the operation of an interconnected audio device, such as a headset, microphone and/or speakers connected to the client device.

Based on the determined audio control intention, a client device may control the operation of one or more audio devices. For example, a client device may determine audio control intention by evaluating image frames depicting a video conference participant. Based on the determined audio control intention a client device may perform various operations to control an audio device. For example, the client device may mute a microphone, reduce or increase the gain level of a microphone, or increase or decrease the volume of a speaker. The client device may perform system level or application-level control of audio parameters (such as speaker volume and/or microphone gain levels).

The User Interface Module 152 provides system functionality for presenting a user interface to one or more users of the video communication platform 140 and receiving and processing user input from the users. User inputs received by the user interface herein may include clicks, keyboard inputs, touch inputs, taps, swipes, gestures, voice commands, activation of interface controls, and other user inputs. In some embodiments, the User Interface Module 152 presents a visual user interface on a display screen. In some embodiments, the user interface may comprise audio user interfaces such as sound-based interfaces and voice commands.

The Image Acquisition Module 156 provides system functionality for obtaining images of a video conference participant for input to the trained machine learning network. For example, one or more images may be obtained by a client device where the images depict a video conference participant during a video communications session.

The AV1 Encoding Module 158 provides system functionality for encoding video using the AV1 codec.

The Transform Kernel Selection Module 160 provides system functional for selecting transform kernels for use in encoding video using the AV1 code.

The Video Decoding Module 162 provides system functionality for decoding video that was encoded with the AV1 codec.

Figure 2:
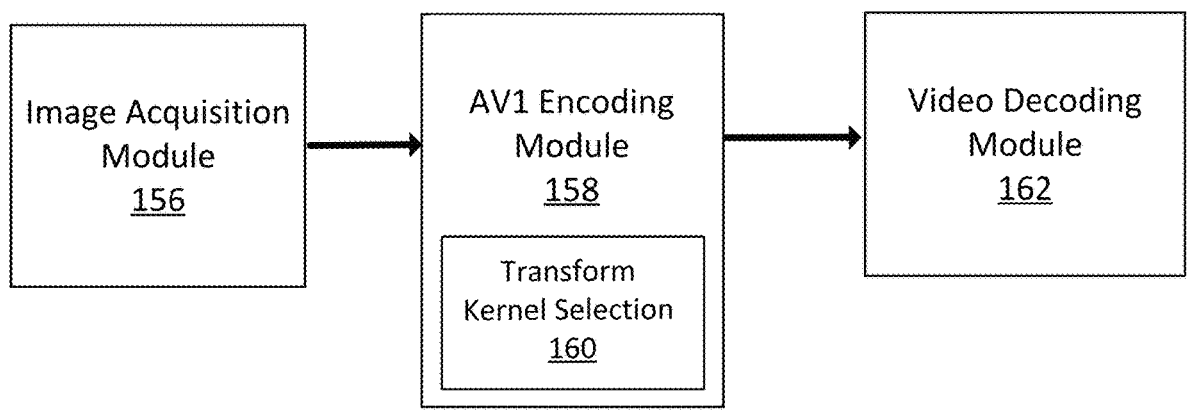
FIG. 2 is a diagram illustrating an exemplary environment in which some embodiments may operate.

FIG. 2 is a diagram illustrating an exemplary environment in which some embodiments may operate. In this example, video including multiple image frames depicting a video conference participant may be obtained via the Image Acquisition Module 156.

The Image Acquisition Module 156 then provides an image or images to the AV1 Encoding Module 158 which encodes the images via the AV1 codec. The AV1 Encoding Module 158 communicates with the Transform Kernel Selection Module 160 which performs a selection process for transform kernels to be used with the AV1 encoding process. The Video Decoding Module 162 decodes received video that was encoded via the AV1 Encoding Module 158.

AV1 Video Codec Encoding and Transform Kernel Selection

In some embodiments, the system may encode video frames using the AV1 codec using a selected transform kernel. In some embodiments, a client device may receive multiple image frames. The client device may then process the image frames and determine a transform size for a portion of one or more images. Based on the determined transform size, the system selects a transform kernel from a predetermined list of transform kernels. Multiple portions of each image frame of the multiple image frame may be processed to determine a transform size for the portion of the image. The predetermined list includes multiple different transform sizes with each transform size either having an associated single predetermined transform kernel and/or having an associated set of available transform kernels from which to evaluate for use as a transform kernel. The system selects a transform kernel as a parameter to encode a video stream using the AV1 video codec. The encoded video is transmitted by the client device to a server and/or to another receiving client device. The receiving client device then decodes the received video stream.

In some embodiments, the system may determine a transform size dividing an image frame into non-overlapping blocks of a predetermined pixel size, such as 64×64 pixels. Each of these blocks (i.e., the portions of the image frame) may be referred to as a superblock. The system calculates a cost value of encoding the current superblock as a 64×64 (Depth=0 layer) block. The system divides a superblock into 4 non-overlapping 32×32 subblocks, and calculates the sum of the encoding cost value of the four 32×32 (Depth=1 layer) blocks. The system compares the compare the encoding cost value of two layers, and chooses the division method with the smallest encoding cost. The block division form is recursive and each 32×32 block may be further divided down into four 16×16 blocks. The smallest block is 4×4, which means the maximum sub-depth is 4. When encoding a block, the size of the block is determined, so the transform size is also determined. In this process, the system determines transform size and then selects the transform kernel.

In some embodiments, the system may select a transform kernel by performing a fast search and selection process. For example, the system may select a specific transform kernel where the system has been preconfigured that transform kernel for a particular transform size. Additionally, the system may select a specific transform kernel where the system evaluates multiple transform kernels that have been associated as a set of available transform kernels for a particular transform size. The system may evaluate one or more candidates from the set. In some embodiments, the system may perform a frequency domain distortion process on a current transform kernel being evaluated. In some embodiments, the system may apply an early termination to the frequency domain distortion process and select a suitable transform kernel as a parameter for encoding with the AV1 coded without having to evaluate every transform kernel in the set.

The AV1 video codec was developed by the Alliance for Open Media consortium(aomedia.org). The AV1 video compression format uses a defined set of transform kernels which can be selected during the encoding. Further details of the AV1 video compression format is described in the paper A Technical Overview of AV1, IEEE, Jingning Han, et al. (See https://arxiv.org/pdf/2008.06091.pdf, which is hereby incorporated by reference it its entirety).

Resources for the AV1 Video Codec may be found at https.//aomedia.org/av1/, https://github.com/AOMediaCodec/community/wiki, https://aomedia.org/av1/specification/ https://aomediacodec.github.io/av1-spec/av1-spec.pdf and https://aomediacodec.github.io/av1-spec/. Each of the noted references are hereby incorporated by reference in their entirety.

The AV1 specification identifies a total of 16 two-dimensional transform kernels. (Shown in Table 1). The 16 two-dimensional transform kernels provide transform combinations with independent horizontal & vertical 1D transform selection. The AV1 specifications indicates that four transform options could be considered, namely Discrete Cosine Transform (DCT), Asymmetric Discrete Sine Transform (ADST), Flipped (reverse) ADST (FLIPADST) and the Identity Transform (IDTX). The AV1 specification allows each transform block to choose its own transform kernel independently. The 2-D separable transform kernels are extended to combinations of four 1-D kernels: DCT, ADST, flipped ADST (FLIPADST), and identity transform (IDTX), resulting in a total of 16 2-D transform kernels. The FLIPADST is a reverse of the ADST kernel. The kernels are selected based on statistics and to accommodate various boundary conditions.

TABLE 1

| Number | Transform Type | Vertical | Horizontal |
|---|---|---|---|
| 1 | DCT_DCT | DCT | DCT |
| 2 | ADST_DCT | ADST | DCT |
| 3 | DCT_ADST | DCT | ADST |
| 4 | ADST_ADST | ADST | ADST |
| 5 | FLIPADST_DCT | FLIPADST | DCT |
| 6 | DCT_FLIPADST | DCT | FLIPADST |
| 7 | FLIPADST_FLIPADST | FLIPADST | FLIPADST |
| 8 | ADST_FLIPADST | ADST | FLIPADST |
| 9 | FLIPADST_ADST | FLIPADST | ADST |
| 10 | IDTX | IDTX | IDTX |
| 11 | V_DCT | DCT | IDTX |
| 12 | H_DCT | IDTX | DCT |
| 13 | V_ADST | ADST | IDTX |
| 14 | H_ADST | IDTX | ADST |
| 15 | V_FLIPADST | FLIPADST | IDTX |
| 16 | H_FLIPADST | IDTX | FLIPADST |

The AV1 specification indicates 6 sets of transform kernels. (Shown in Table 2).

TABLE 2

| Set Num | Set of transform kernels | Scope |
|---|---|---|
| Set$_1$ | DCT_DCT | Intra/Inter Block |
| Set$_2$ | DCT_DCT/ADST_DCT/DCT_ADST/ ADST_ADST/IDTX/V_DCT/H_DCT | Intra Block |
| Set$_3$ | DCT_DCT/ADST_DCT/DCT_ADST/ ADST_ADST/IDTX | Intra Block |
| Set$_4$ | DCT_DCT/ADST_DCT/DCT_ADST/ | Inter Block |

TABLE 2-continued

| Set Num | Set of transform kernels | Scope |
|---|---|---|
| Set5 | ADST_ADST/FLIPADST_DCT/ DCT_FLIPADST/FLIPADST_FLIPADST/ ADST_FLIPADST/FLIPADST_ADST/IDTX/ V_DCT/H_DCT/V_ADST/H_ADST/ V_FLIPADST/H_FLIPADST DCT_DCT/ADST_DCT/DCT_ADST/ ADST_ADST/FLIPADST_DCT/ DCT_FLIPADST/FLIPADST_FLIPADST/ ADST_FLIPADST/FLIPADST_ADST/IDTX/ V_DCT/H_DCT | Inter Block |

The AV1 specification indicates a total of 19 transform sizes. (Show in Table 3). The table depicts the correspondence between transform size and transform kernel set. Both square and rectangle transform block size is supported in AV1. For transform blocks of different sizes, AV1 specifies corresponding set of transform kernels for them. In the case of the syntax element reduced_tx_set equals zero and one respectively.

TABLE 3

| | | reduced_tx_set = 0 | | reduced_tx_set = 1 | |
|---|---|---|---|---|---|
| Number | Transform block size | Intra block | Inter Block | Intra block | Inter Block |
| 1 | 4 × 4 | Set-2 | Set-4 | Set-3 | Set-6 |
| 2 | 8 × 8 | Set-2 | Set-4 | Set-3 | Set-6 |
| 3 | 16 × 16 | Set-3 | Set-5 | Set-3 | Set-6 |
| 4 | 32 × 32 | Set-1 | Set-6 | Set-1 | Set-6 |
| 5 | 64 × 64 | Set-1 | Set-1 | Set-1 | Set-1 |
| 6 | 4 × 8 | Set-2 | Set-4 | Set-3 | Set-6 |
| 7 | 8 × 4 | Set-2 | Set-4 | Set-3 | Set-6 |
| 8 | 8 × 16 | Set-2 | Set-4 | Set-3 | Set-6 |
| 9 | 16 × 8 | Set-2 | Set-4 | Set-3 | Set-6 |
| 10 | 16 × 32 | Set-1 | Set-6 | Set-1 | Set-6 |
| 11 | 32 × 16 | Set-1 | Set-6 | Set-1 | Set-6 |
| 12 | 32 × 64 | Set-1 | Set-1 | Set-1 | Set-1 |
| 13 | 64 × 32 | Set-1 | Set-1 | Set-1 | Set-1 |
| 14 | 4 × 16 | Set-2 | Set-4 | Set-3 | Set-6 |
| 15 | 16 × 4 | Set-2 | Set-4 | Set-3 | Set-6 |
| 16 | 8 × 32 | Set-1 | Set-6 | Set-1 | Set-6 |
| 17 | 32 × 8 | Set-1 | Set-6 | Set-1 | Set-6 |
| 18 | 16 × 64 | Set-1 | Set-1 | Set-1 | Set-1 |
| 19 | 64 × 16 | Set-1 | Set-1 | Set-1 | Set-1 |

Figure 3A:
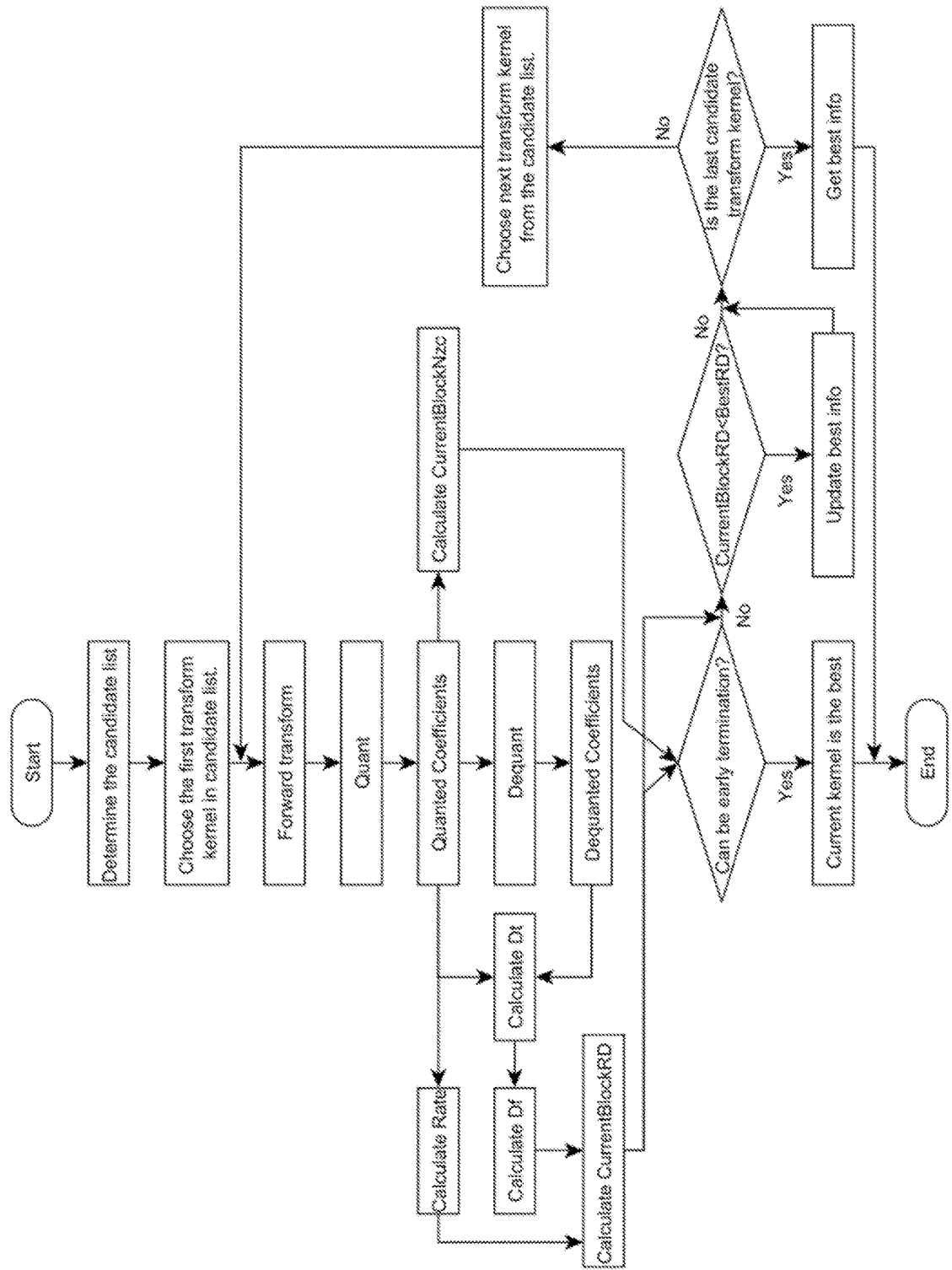
FIG. 3A is a diagram illustrating an exemplary transform kernel selection process.

FIG. 3A illustrates a process for transform kernel selection. For different transform sizes, the system selects an optimal transform kernel in the corresponding set as soon as possible to achieve an optimal coding performance. The method of fast search of transform kernel, as described herein, improves coding speed while balancing the compression rate and coding quality. In one embodiment, this method includes three processing functions including (1) determining a transform kernel subset, (2) apply frequency domain distortion, and (3) apply early termination and use current transform kernel.

Determining Transform Kernel Subset

A transform kernel subset listing may be selected, pre-configured or generated for use by the system. The transform kernel subset listing associates a transform block size with multiple transform kernels that may be used by the system to encode using the AV1 codec for a particular transform block size. In some cases, offline training may be performed with a set of video sequences to pre-select a subset of the transform kernels that are more suitable for a particular use case (such as real time video conferencing).

Through data training, N number of transform kernels (from Table 1) are selected to for form a set $S_0$ of candidate transform kernels. A subjective quality, BD-rate and coding speed as indicators may be used to select transform kernels. This subset is expressed as $S_0$, where $S_0=\{k_1, k_2, \ldots, k_N\}$, and where $k_i(i \in [1, N])$ represents one of the transform kernels. The $k_i$ transform kernel that is selected provides good compression performance and has a high selection probability according to the statistical results based on our test sequences of image frames. The order of $k_i$ transform kernels may be adjusted where the order is related to the statistical probability that the transform kernel is selected. For different transform sizes, the elements in the final transform kernel candidate list are the intersection of set elements specified in AV1 protocol (from Table 1) and $S_0$. In some embodiments, there are totally six final sets of transform kernels. The sets of transform kernels may be expressed as $S_j$ ($j \in [1, 6]$). Each $S_j$, may be expressed as $S_j=Set_j \cap S_0$. For example, considering an intra 16×16 block with reduced_tx_set equals to zero, its candidate list of transform kernels is the intersection of $Set_3$ and $S_0$.

Frame types can be described as IDR frame and Non-IDR frame. The system may use different prediction models for different frame types. Different prediction models allows for different distribution of residual blocks. Determine different candidate lists for different frame types may be determined. For frames with more average information of residual blocks, the system may increase the number of candidates transform kernels to take advantage of the characteristics of different transform kernels. For frames with less total residual energy or information, the number of candidates transform kernels may be reduced. This is allowable because the compression efficiency of different transform kernels is similar and the gain improvement is not high.

Processing may also be adjusted according to the resolution of an image frame. For different resolution sizes of image frames, the system control coding speed as to compression efficiency. For frames with larger resolutions, the system may use a reduced number of candidates of transform kernels thereby improving the encoding speed. For smaller resolutions, the system may use a larger or increased number of transform kernel candidates to improve the compression efficiency. In some embodiments, the system may be predetermined specific transform kernel for a specific transform block size.

Applying Frequency Domain Distortion

Figure 3B:
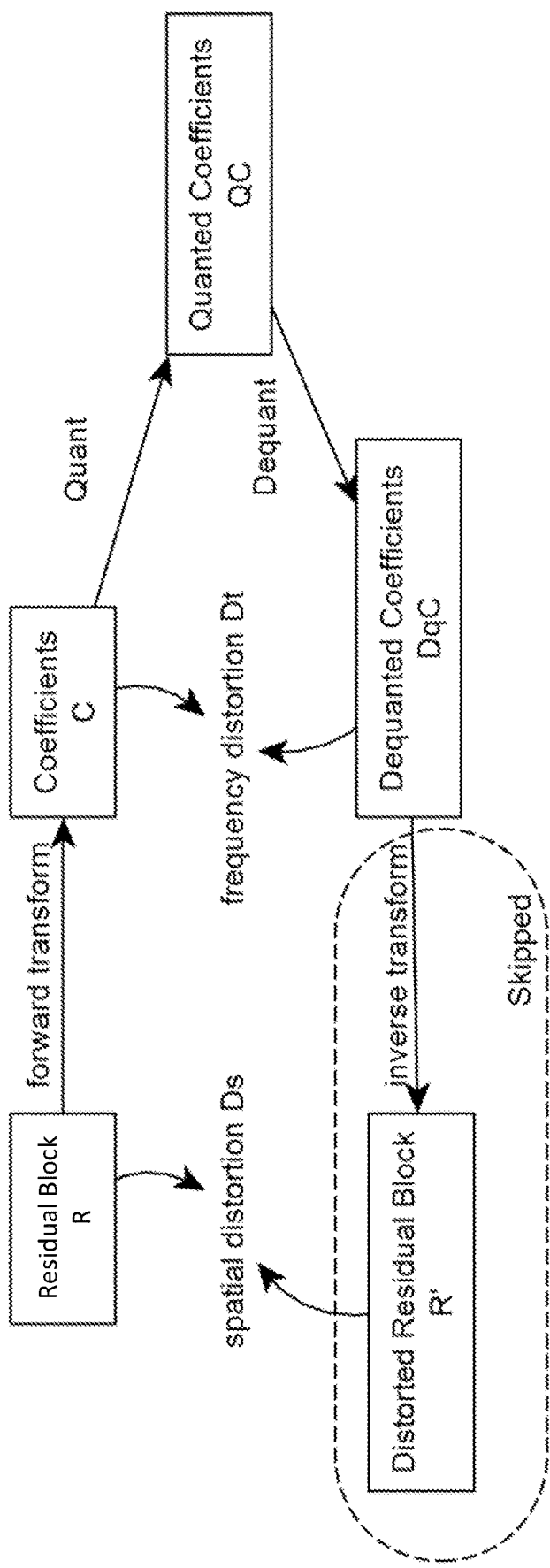
FIG. 3B is a diagram illustrating an exemplary transform and quantization process.

FIG. 3B is a diagram depicting the process of transform and quantization. As illustrated in FIG. 3B, the system performs the process of forward transform, quant/dequant and inverse transform. For each transform kernel, the whole process is performed by the system, and the system calculates the cost of each transform kernel. The cost value includes two aspects. First, it is the code rate, which is calculated by quantized coefficients, and second, it is the distortion, which is characterized by the SSE calculated by residual blocks and distorted residual blocks. Performing that whole process has an associated time needed to perform the process.

Since the forward and inverse transform process should not lose information, the distortion Dt calculated by coefficients and dequant coefficients is proportional to the distortion Ds may be calculated by the residual block and the distorted residual block.

In the transform domain, the system directly calculates the sum of square error (SSE) of transform coefficients between before and after quantization as the distortion Dt. At the same time, the system may adjust the Dt a certain factor to obtain a more accurate distortion value as the final distortion Df, as shown in formula Df=Dt/Factor. This factor value is related to the transform block size and the process of transform defined in the AV1 protocol. The larger the size of the transform block, the smaller the value of factor.

Applying Early Termination and Use Current Transform Kernel

In some embodiments, to improve the encoding speed, the system early terminates the process of transform kernel selection by selecting or predefining thresholds on the number of the non-zero quantized coefficients and the encoding RD cost value. This early termination process allows the system to select a suitable transform kernel as a parameter for encoding with the AV1 coded without having to evaluate every transform kernel in the set (e.g., $S_j$).

The thresholds ensure a minimum level of subjective and objective video quality. If the number of quantized non-zero coefficients is relatively small, this indicates that the performance of the current transform kernel is good enough, and no more transform kernels need to be tried. In this situation the search for transform kernels can be terminated in advance. At the same time, if the cost of the current transform kernel after encoding is small enough, this indicates that the current transform kernel is a better transform kernel for selection and the system can adapt to the distribution of the residual block.

In some embodiments, the system may evaluate for early termination be evaluating the (CurrentBlockNzc<ThresholdNZ)|| (CurrentBlockRD<ThresholdRD). The CurrentBlockNzc indicates a position of the last non-zero coefficient after the current block is transformed, quantized and scanned. The ThresholdNZ is used as a threshold, and its value is related to the size of the transform block. The larger the block, the larger the corresponding threshold. The CurrentBlockRD represents the rate-distortion cost of the current block. The threshold of encoding RD cost value ThresholdRD can be calculated as ThresholdRD=f(P). The symbol P represents the total pixels of the corresponding transform size. If expression (CurrentBlockNzc<ThresholdNZ) (CurrentBlockRD<ThresholdRD) is true, then the system may early terminate, otherwise, subsequent steps would continue to be performed.

In some embodiments, the system may provide a lookup table for various transform sizes early termination based on predetermined threshold values. In some embodiments, the system may use a table for providing threshold values of the non-zero quantized coefficients. The lookup table may include having non-zero quantized coefficients threshold values to determine when to terminate. For example, the transform block size 4×4 may have a particular ThresholdNZ value, and other transform sizes may have the same or different Threshold NZ values.

Figure 4:
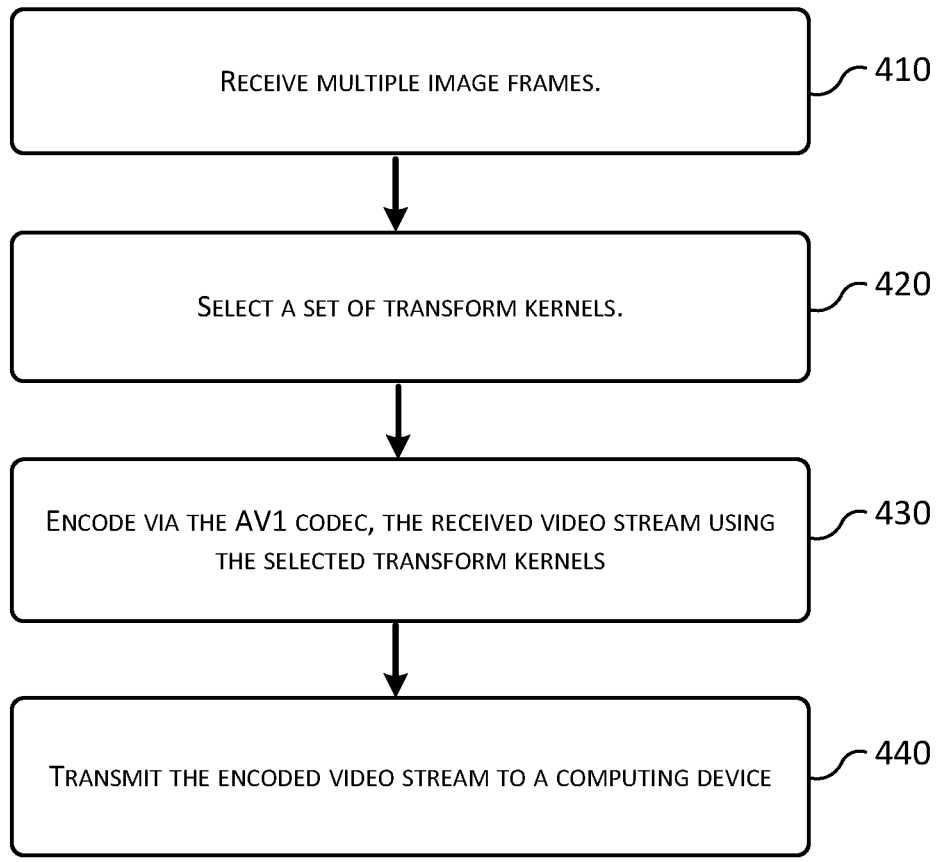
FIG. 4 is a flow chart illustrating an exemplary method that may be performed in some embodiments.

FIG. 4 is a flow chart illustrating an exemplary method 400 that may be performed in some embodiments. In step 410, a client device receives multiple image frames. For example, the client device may receive a video stream depicting a video conference participant communicating during a video communications session.

In step 420, the client device selects a set of transform kernels. For example, the client device may perform the transform kernel selection processes as described herein to select the set of transform kernels.

In step 430, the client device encodes the received multiple image frames with the AV1 codec. The AV1 codec uses the selected transform kernels for the encoding process.

In step 440, the client device transmits the encoded video stream to another computing device.

Figure 5:
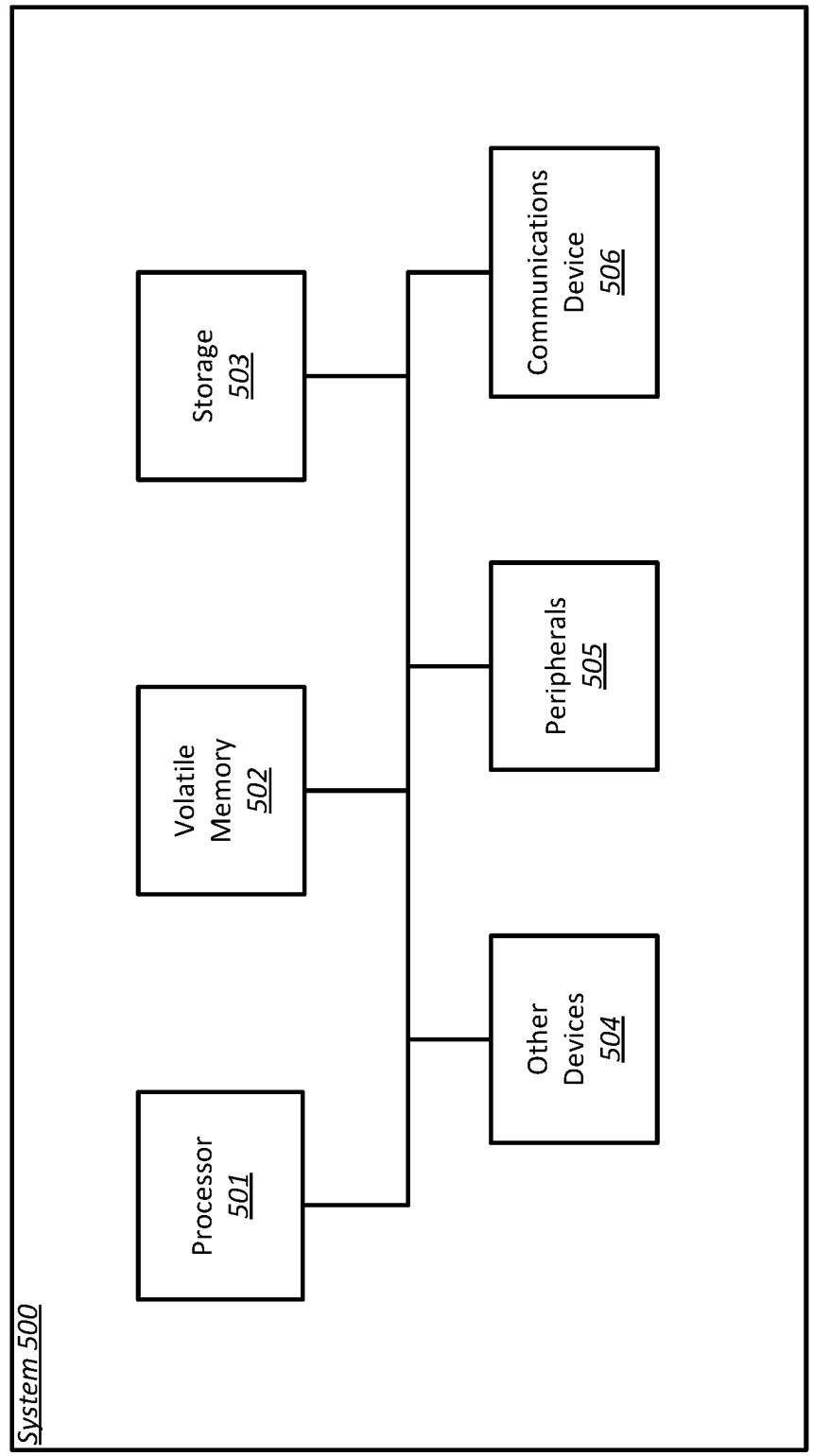
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 500 to an external medium. For example, communications device 506 may take the form of a network adapter that provides communications to a network. A computer 500 may also include a variety of other devices 504. The various components of the computer 500 may be connected by a connection medium such as a bus, crossbar, or network.

It will be appreciated that the present disclosure may include any one and up to all of the following examples.

Example 1: A computer-implemented method comprising: receiving, via a client device, multiple image frames; determining a transform size for a portion of an image frame of the multiple image frames; based on the determined transform size, selecting a transform kernel from a predetermined list of transform kernels, the predetermined list comprising: for at least one transform size having an associated predetermined transform kernel; and for at least one transform size having an associated set of available transform kernels; using the selected transform kernel as a parameter to encode a video stream using an AV1 codec for the portion of the image frame; and transmitting the encoded video stream to another computing device.

Example 2. The method of Example 1, wherein the selecting a transform kernel comprises: identifying for the determined transform size a transform kernel in the list of transform kernels the associated predetermined transform kernel; and choosing as the selected transform kernel the associated predetermined transform kernel.

Example 3. The method of any one of Examples 1-2, wherein the associated predetermined transform kernel is $k_i$, and $k_i$ is one of the element in $S_j$.

Example 4. The method of any one of Examples 1-3, wherein the selecting a transform kernel further comprises: where the determined transform size has an associated set of available transform kernels, evaluating the available transform kernels as one or more candidates for use as the selected transform kernel.

Example 5. The method of any one of Examples 1-4, wherein the associated set of available transform kernels comprise M kernels, where M≤N.

Example 6. The method of any one of Examples 1-5, wherein evaluating the available transform kernels comprises: for each of the available transform kernels, performing a frequency domain distortion process on a then current candidate transform kernel.

Example 7. The method of any one of Examples 1-6, further comprising: applying an early termination to the frequency domain distortion process; and using the then current candidate transform kernel as the selected transform kernel.

Example 8. A non-transitory computer readable medium that stores executable program instructions that when executed by one or more computing devices configure the one or more computing devices to perform operations comprising: receiving, via a client device, multiple image frames; determining a transform size for a portion of an image frame of the multiple image frames; based on the determined transform size, selecting a transform kernel from a predetermined list of transform kernels, the predetermined list comprising: for at least one transform size having an associated predetermined transform kernel; and for at least one transform size having an associated set of available transform kernels; using the selected transform kernel as a parameter to encode a video stream using an AV1 codec for the portion of the image frame; and transmitting the encoded video stream to another computing device.

Example 9. The non-transitory computer readable medium of Example 8, wherein the selecting a transform kernel comprises: identifying for the determined transform size a transform size in the list of transform kernels the associated predetermined transform kernel; and choosing as the selected transform kernel the associated predetermined transform kernel.

Example 10. The non-transitory computer readable medium of any one of Examples 8-9, wherein the associated predetermined transform kernel is $k_i$, and $k_i$ is one of the element in $S_j$.

Example 11. The non-transitory computer readable medium of any one of Examples 8-10, wherein the selecting a transform kernel further comprises: where the determined transform size has an associated set of available transform kernels, evaluating the available transform kernels as one or more candidates for use as the selected transform kernel.

Example 12. The non-transitory computer readable medium of any one of Examples 8-11, wherein the associated set of available transform kernels comprise M kernels, where M≤N.

Example 13. The non-transitory computer readable medium of any one of Examples 8-12, wherein evaluating the available transform kernels comprises: for each of the available transform kernels, performing a frequency domain distortion process on a then current candidate transform kernel.

Example 14. The non-transitory computer readable medium of any one of Examples 8-13, further comprising: applying an early termination to the frequency domain distortion process; and using the then current candidate transform kernel as the selected transform kernel.

Example 15. A system comprising one or more processors configured to perform the operations of: receiving, via a client device, multiple image frames; determining a transform size for a portion of an image frame of the multiple image frames; based on the determined transform size, selecting a transform kernel from a predetermined list of transform kernels, the predetermined list comprising: for at least one transform size having an associated predetermined transform kernel; and for at least one transform size having an associated set of available transform kernels; using the selected transform kernel as a parameter to encode a video stream using an AV1 codec for the portion of the image frame; and transmitting the encoded video stream to another computing device.

Example 16. The system of Example 15, wherein the selecting a transform kernel comprises: identifying for the determined transform size a transform size in the list of transform kernels the associated predetermined transform kernel; and choosing as the selected transform kernel the associated predetermined transform kernel.

Example 17. The system of any one of Examples 15-16, wherein the associated predetermined transform kernel is $k_i$, and $k_i$ is one of the element in $S_j$.

Example 18. The system of any one of Examples 15-17, wherein the selecting a transform kernel further comprises: where the determined transform size has an associated set of available transform kernels, evaluating the available transform kernels as one or more candidates for use as the selected transform kernel.

Example 19. The system of any one of Examples 15-18, wherein the associated set of available transform kernels comprise M kernels, where M≤N.

Example 20. The system of any one of Examples 15-19, wherein evaluating the available transform kernels comprises: for each of the available transform kernels, performing a frequency domain distortion process on a then current candidate transform kernel.

Example 21. The system of any one of Examples 15-20, further comprising: applying an early termination to the frequency domain distortion process; and using the then current candidate transform kernel as the selected transform kernel.

Some portions of the preceding detailed descriptions have been presented in terms of algorithms, equations and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:
    receiving, via a client device, multiple image frames;
    determining a transform size for a portion of an image frame of the multiple image frames;
    generating a list of transform kernels, comprising:
        determining a first subset of transform kernels based on selection probabilities determined using offline data training;
        selecting a second subset of transform kernels based on the transform size, a prediction mode, and an indication of a size of the second subset; and
        generating the list of transform kernels comprising determining an intersection of the first subset and the second subset;
    based on the determined transform size, selecting a transform kernel from the list of transform kernels;
    using the selected transform kernel as a parameter to encode a video stream using an AV1 codec for the portion of the image frame; and
    transmitting the encoded video stream to another computing device.

2. The method of claim 1, wherein selecting the transform kernel from the list of transform kernels comprises:
    identifying, for the determined transform size, a first transform kernel in the list of transform kernels; and
    choosing as the selected transform kernel the first transform kernel.

3. The method of claim 1, wherein:
    the first subset of transform kernels is given by $S_0$, wherein $S_0$ represents a set of N transform kernels denoted by $k_i$, wherein i is an integer between 1 and N.

4. The method of claim 2, wherein the selecting the transform kernel from the list of transform kernels further comprises:
    where the determined transform size has an associated first set of available transform kernels in the list of transform kernels, evaluating the available transform kernels in the associated first set of available transform kernels as one or more candidates for use as the selected transform kernel.

5. The method of claim 4, wherein evaluating the available transform kernels comprises:
    for each of the available transform kernels, performing a frequency domain distortion process on a then current candidate transform kernel.

6. The method of claim 5, further comprising:
    applying an early termination to the frequency domain distortion process, and using the then current candidate transform kernel as the selected transform kernel.

7. A non-transitory computer readable medium that stores executable program instructions that when executed by one or more computing devices configure the one or more computing devices to perform operations comprising:
    receiving, via a client device, multiple image frames;
    determining a transform size for a portion of an image frame of the multiple image frames;
    generating a list of transform kernels, comprising:
        determining a first subset of transform kernels based on selection probabilities determined using offline data training;
        selecting a second subset of transform kernels based on the transform size, a prediction mode, and an indication of a size of the second subset; and
        generating the list of transform kernels, comprising determining an intersection of the first subset and the second subset;
    based on the determined transform size, selecting a transform kernel from the list of transform kernels;
    using the selected transform kernel as a parameter to encode a video stream using an AV1 codec for the portion of the image frame; and
    transmitting the encoded video stream to another computing device.

8. The non-transitory computer readable medium of claim 7, wherein selecting the transform kernel from the list of transform kernels comprises:
    identifying, for the determined transform size, a first transform kernel in the list of transform kernels; and
    choosing as the selected transform kernel the first transform kernel.

9. The non-transitory computer readable medium of claim 7, wherein:
    the first subset of transform kernels is given by $S_0$, wherein $S_0$ represents a set of N transform kernels denoted by $k_i$, wherein i is an integer between 1 and N.

10. The non-transitory computer readable medium of claim 8, wherein the selecting the transform kernel from the list of transform kernels further comprises:
    where the determined transform size has an associated first set of available transform kernels in the list of transform kernels, evaluating the available transform kernels in the associated first set of available transform kernels as one or more candidates for use as the selected transform kernel.

11. The non-transitory computer readable medium of claim 10, wherein evaluating the available transform kernels comprises:
for each of the available transform kernels, performing a frequency domain distortion process on a then current candidate transform kernel.

12. The non-transitory computer readable medium of claim 11, further comprising:
applying an early termination to the frequency domain distortion process, and using the then current candidate transform kernel as the selected transform kernel.

13. A system comprising one or more processors configured to perform the operations of:
receiving, via a client device, multiple image frames;
determining a transform size for a portion of an image frame of the multiple image frames;
generating a list of transform kernels, comprising:
determining a first subset of transform kernels based on selection probabilities determined using offline data training;
selecting a second subset of transform kernels based on the transform size, a prediction mode, and an indication of a size of the second subset; and
generating the list of transform kernels, comprising determining an intersection of the first subset and the second subset;
based on the determined transform size, selecting a transform kernel from the list of transform kernels;
using the selected transform kernel as a parameter to encode a video stream using an AV1 codec for the portion of the image frame; and
transmitting the encoded video stream to another computing device.

14. The system of claim 13, wherein selecting the transform kernel from the list of transform kernels comprises:
identifying, for the determined transform size, a first transform kernel in the list of transform kernels; and
choosing as the selected transform kernel the first transform kernel.

15. The system of claim 13, wherein:
the first subset of transform kernels is given by $S_0$, wherein $S_0$ represents a set of N transform kernels denoted by $k_i$, wherein i is an integer between 1 and N.

16. The system of claim 14, wherein the selecting the transform kernel from the list of transform kernels further comprises:
where the determined transform size has an associated first set of available transform kernels in the list of transform kernels, evaluating the available transform kernels in the associated first set of available transform kernels as one or more candidates for use as the selected transform kernel.

17. The system of claim 16, wherein evaluating the available transform kernels comprises:
for each of the available transform kernels, performing a frequency domain distortion process on a then current candidate transform kernel.

18. The computer-implemented method of claim 1, wherein the indication of the size of the second subset is a Boolean flag indicating whether to use a reduced-size second subset of transform kernels.

19. The computer-implemented method of claim 1, wherein the second subset of transform kernels is selected from a predetermined collection of transform kernel subsets, wherein each transform kernel subset includes one or more transform kernels and is associated with one or more prediction modes.

20. The computer-implemented method of claim 1, wherein the prediction mode is one of inter-frame prediction or intra-frame prediction.

* * * * *